Patented Sept. 17, 1929

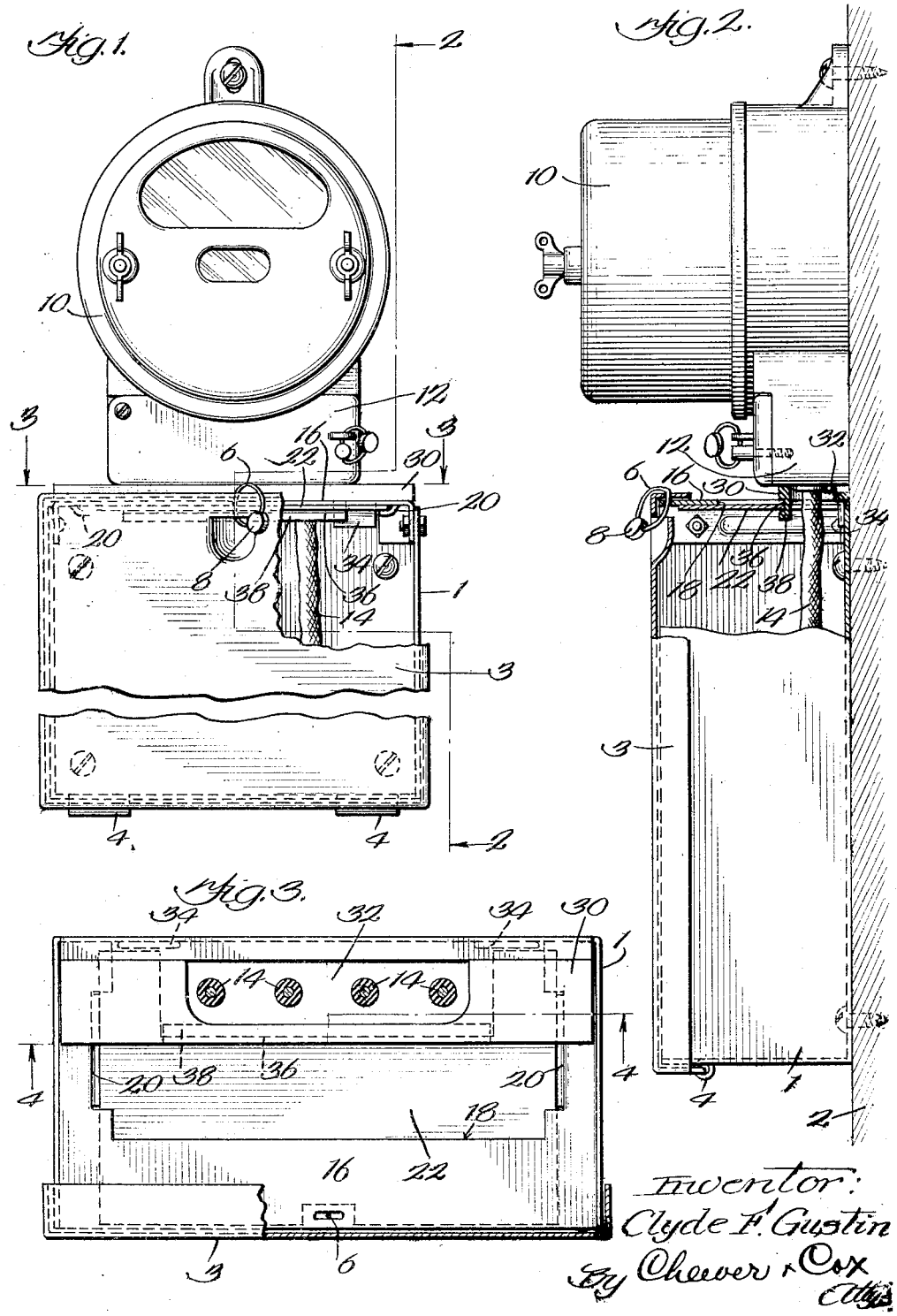

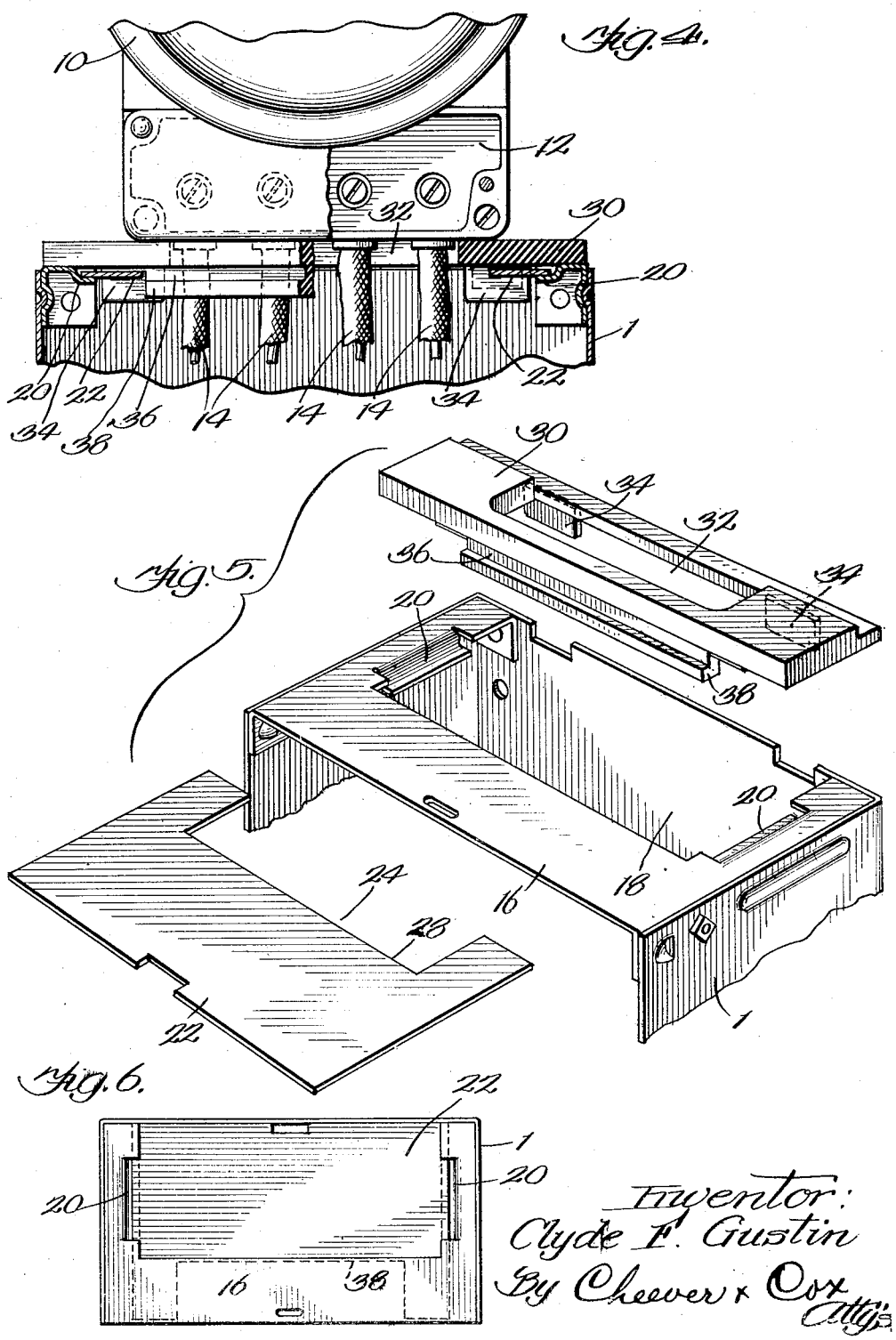

1,728,271

UNITED STATES PATENT OFFICE

CLYDE F. GUSTIN, OF LA GRANGE, ILLINOIS, ASSIGNOR TO ASSOCIATED ENGINEERS COMPANY, OF CHICAGO, ILLINOIS

CLOSURE FOR SWITCH BOXES

Application filed April 14, 1924. Serial No. 706,275.

My invention relates to closures for switch boxes, and it applies particularly to cases where the switch box is to be used in connection with an electric meter. It is common practice to install service switches in switch boxes and to employ meters in association with the switch boxes for measuring the electrical energy consumed by the customer. When the customer vacates his premises the electric light and power company usually removes the meter and seals the switch box so that current cannot thereafter be surreptitiously obtained. The object of my invention is to provide means whereby the switch box may be readily converted from a completely closed structure to one that has an opening in it for permitting the electric conductors to extend from the switch box into the meter. As a result of my invention I am able to convert a switch box from a closed to a partially open structure or vice versa by the manipulation of a single element which according to the illustrated design is a plate slidable in guides formed in the switch box. This plate is removable and reversible, and when inserted in one position will form a complete closure for the box and when reversed leaves an opening in it through which the meter loops may pass. In carrying out my invention I have also provided a frame or insert of insulating material which borders the opening in the switch box and serves to insure insulation between the meter loops and the border of the opening through the box. This frame interlocks with the box closure in such manner as to safeguard the conductors passing between the switch box and the meter, thus preventing a tenant from tapping the wires and obtaining electric energy without having the same recorded in the meter.

I obtain the foregoing characteristics in the manner illustrated in the accompanying drawings in which Figure 1 is a front view of a complete installation showing the switch box and meter. A portion of the box is broken away to reveal the internal construction and to save space on the drawing.

Figure 2 is a sectional elevation on the line 2—2 Figure 1.

Figure 3 is a plan section on the line 3—3 Figure 1.

Figure 4 is a fragmentary elevation partly in section showing the upper portion of the switch box and lower portion of the meter.

Figure 5 is a perspective view showing the parts distributed but suggesting the manner in which they may be assembled.

Figure 6 is a top view of the box showing the closure plate in the position which it occupies to completely close the box.

Like numerals denote like parts throughout the several views.

Referring to the form shown in the accompanying drawing, the switch box 1 is of ordinary rectangular outline and is adapted to be screwed and otherwise fastened to a wall 2 or other support. The box has a front cover 3 which in the present instance is hinged to the box at the points 4 at the bottom. It may be secured at the top by passing a ring 6 through a suitable aperture in the upper end of the box cover and the top of the box as well illustrated in Figure 2. It is customary to apply a seal 8 to such ring or wire loop in order that the meter inspector may determine whether the box has been tampered with between visits. It will be understood that the design of the box as regards the parts thus far described is non-essential and may be considerably varied without departing from the spirit of the invention.

The meter 10 may be of various designs although in general the meters have a base 12 adapted to come into juxtaposition with the switch box so that the base may come close to the box at the point where the electric conductors or meter loops 14 pass from one to the other. One of the walls of the switch box, viz, the one which will come adjacent to the meter and which ordinarily is the top wall of the box and is here indicated by reference numeral 16, has an opening 18 in it as shown in perspective in Figure 5. This opening comes at the rear portion of the box beneath the point where the meter will be installed. Guides 20 are provided at the ends of this opening for guiding the closure plate 22. Said plate is approximately of the same size and shape as the top of the switch box, but has a portion of the rear edge cut away to form an opening 24. The shape and proportions are such that when this plate is inserted in the guides in one position, for example the position shown in Figures 1, 2 and 4, and suggested in Figure 5, the opening 24 will register with the opening 18 in the top of the switch box with the result that the meter conductors 14 may pass from the box to the meter and return. When the plate is reversed, however, that is rotated 180° in its own plane and inserted into the guides, the openings will be out of register and the plate will form a complete closure as shown in Figures 3 and 6.

According to my invention in its developed form, I provide means for insulating the switch box from the meter and for preventing the meter conductors from touching the box. I accomplish this by providing a frame 30 which is illustrated in perspective in Figure 5, and in Figures 1, 2 and 4 is seen seated upon the top of the box and supporting the meter. This frame is preferably of hard rubber or other suitable insulating material and has a central opening 32 through which the meter loops may pass and by which they may be prevented from coming into contact with the margins of the opening through which they pass. This frame is here shown to be of a length approximately equal to the width of the switch box so that the ends of the frame may rest upon the top of the box. It has depending integral lugs 34 at the back for preventing the frame from shifting longitudinally or rearwardly. At the front it has a depending integral lug 36 adapted to be engaged by the inner edge 28 of the closure plate 22 when the latter is inserted in the position shown in Figure 2 and suggested in Figure 5. This lug has a forward projecting flange 38 at the bottom which prevents the frame from being lifted out when the closure plate is in the position mentioned. In other words, the frame has a flanged locking lug adapted to cooperate with the closure plate to hold the frame locked in position on the box under metering or operating conditions.

In practice, when the meter is installed the parts will appear as shown in Figures 1, 2 and 4. The insulating frame 30 will be seated upon the top of the box, and the meter will be seated upon it, the closure plate 22 forming a lock to prevent the frame from being lifted off the box. This may be regarded as the normal position of the closure plate. The switch box is normally closed and sealed by the wire ring or loop and seal 8 or in any other suitable manner. If now the tenant vacates the premises and it is desired to remove the meter the representative of the power company will break the seal upon the switch box, withdraw the closure plate 22 and remove the meter and insulating frame 30. He will then reinsert the closure plate in reversed position as shown in Figures 3 and 6, whereupon he will close the front cover 3 and seal it. The result will be that the switch and conductors will be completely enclosed and sealed, and current cannot be obtained without detection.

For convenience I have shown and described the opening in the top of the switch box, but it will be understood that it will be equally possible to place such opening in either of the side walls or in the bottom. The ordinary construction, however, is to have the meter opening come at the top of the box.

It is usually preferable to make the frame 30 of insulating material for by so doing the box will be insulated from the meter and the conductors will be insulated from both the box and the meter. However, the frame may be made of metal, in which case it will still serve as a seat for the meter and as a connecting element between the box and the meter, and as a stop for limiting the inward movement of the closure 22.

Having thus described my invention, what I claim as new and desire to secure by Letters Patent is:

1. A switch box having an opening in one wall near an adjacent wall, guides in said box adjacent said opening, an insulating member having an aperture adapted to line up with said wall opening and to receive a meter base portion, a plate having a recess adapted to line up with said opening and said aperture and having means for engaging said insulating member, said plate being positionable to cover said wall opening when said insulating member is removed.

2. A switch box having an opening in a side wall, a removable insulating frame mounted in said opening and having a passage through it for the accommodation of conductors and a closure plate mounted to the said wall, said plate being capable of occupying either of two positions in its own plane and having an opening which accommodates the frame when said plate is in one position, the frame having a portion extending into the box and having interlocking engagement with the plate and the plate having a portion which covers the opening in the box occupied by the frame when the frame is removed and the cover plate is occupying the other of said positions.

3. A switch box having an opening in a side wall, a removable insulating frame mounted in said opening and having an aperture in it for the accommodation of conductors, and a closure plate slidably mounted to the said wall and arranged parallel and contiguous to the said wall, said frame having a portion extending into the box and interlocking with the plate, said plate being reversible to occupy either of two positions in its own plane and having an opening which accommodates the frame when said plate is in one position, the plate having a portion for closing the opening in the box occupied by the frame when the frame is removed and the plate occupies the other of said positions, said plate interlocking with the frame when the frame and plate are in acting position in the box.

4. A switch box having an opening in a side, a removable insulating frame mounted to the box and forming a margin for the opening for insulating meter conductors extending therethrough from the box, said frame rising above the level of the top of the box for insulating the meter from the box, and a plate removably mounted to the top of the box and having interlocking engagement with said frame for locking the same in position, said plate having a cutout portion for receiving the frame when the latter is mounted to the box and having a portion adapted for closing the opening in the box when said frame is removed and said plate is reversed.

5. A switch box having an opening at a side, a removable insulating frame having an opening for the accommodation of meter conductors, said frame being seated in the box opening to form a margin therefor and extending outwardly of the box wall to space a meter from the switch box, a cover plate, guides on the box for supporting the cover plate contiguous and parallel to the top of the box, said plate having a portion cut away to receive the frame when the latter is in place, said plate and frame having interlocking portions to prevent removal of the frame when the frame and plate are in place.

6. A switch box having an opening in a side thereof, a removable insulating frame having an opening in it for the accommodation of meter conductors and a portion adapted to seat on the box wall at the opening therein to form a margin therefor and to space a meter from the switch box, a cover plate, guides on the box for slidingly supporting the cover plate contiguous and parallel to the top of the box, said cover plate having a portion cut away for accommodating the frame when the latter is in place, said plate and frame having portions interlocking within the box to prevent removal of the frame when the plate and frame are in place, the plate being reversible in its own plane and having a portion adapted to close the entire opening in the box wall when the frame is removed and the plate is in reversed position.

7. A box for switches and the like having an opening in the top, an adapter element formed of insulating material having a portion adapted to seat upon the top of the box to partly cover the opening therein, the adapter element having an opening for the accommodation of electric conductors, a closure plate, and guides at the top of the box for guiding said closure plate and holding it adjacent to the top of the box in a plane parallel thereto, the adapter element having a flange projecting horizontally toward the cover plate in position to be overlaid and engaged by the cover plate to prevent the adapter element from being lifted out.

8. A box for switches and the like having an opening in the top, an adapter element formed of insulating material and having a portion adapted to seat upon the top of the box to partly cover the opening therein, the adapter element having an opening through it for the accommodation of electric conductors, a closure plate, guides at the top of the box for guiding said closure plate and holding it adjacent to the top of the box in a plane parallel thereto, the adapter element having a flange projecting horizontally toward the cover plate to be overlaid and engaged by the cover plate to prevent the adapter element from being lifted out, and means for locking the cover plate against withdrawal.

9. A box for switches and the like having an opening in the top near a side of the box, a reversible closure plate for the opening, an adapter element formed of insulating material and having a portion adapted to seat upon the top of the box to partly cover the opening therein, the adapter element having an opening entirely surrounded by the material of which the adapter element is composed, means for detachably holding the closure plate contiguous to the top of the box in a plane parallel to it, and a projection on the adapter element underlying the closure plate when the latter is in place to prevent the adapter element from being lifted out, the adapter element when in place rising above the top of the box to thereby insulate from the box a meter or the like.

10. A box for switches and the like having an opening in the top near a side of the box, a reversible closure plate for the opening, an adapter element formed of insulating material and having a portion adapted to seat upon the top of the box to partly fill the opening, the adapter element having an opening entirely surrounded by the material of which the adapter element is composed, means for detachably holding the closure plate contiguous to the top of the box in a plane parallel to it, and a projection on the adapter element underlying the cover plate when the latter is in place to prevent the adapter element from being lifted out, the closure plate being cut away to accommodate the adapter element and being reversible in its own plane, and the cover plate having a portion large enough to close the opening in the top of the box when the adapter element is absent and the cover plate is reversed.

In witness whereof, I have hereunto subscribed my name.

CLYDE F. GUSTIN.